(12) United States Patent
Triantos et al.

(10) Patent No.: US 8,954,520 B2
(45) Date of Patent: Feb. 10, 2015

(54) SYSTEMS AND METHODS FOR MANAGING USER-SPECIFIC MODIFICATIONS TO SHARED CONTENT ON AN INDIVIDUAL BASIS

(75) Inventors: Nick Triantos, Woodside, CA (US); Abraham Benjamin de Waal, San Jose, CA (US); Gary King, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 329 days.

(21) Appl. No.: 13/393,204

(22) PCT Filed: Nov. 11, 2011

(86) PCT No.: PCT/US2011/060466
§ 371 (c)(1),
(2), (4) Date: Feb. 28, 2012

(87) PCT Pub. No.: WO2012/065127
PCT Pub. Date: May 18, 2012

(65) Prior Publication Data
US 2013/0124649 A1 May 16, 2013

Related U.S. Application Data

(60) Provisional application No. 61/413,337, filed on Nov. 12, 2010, provisional application No. 61/413,333, filed on Nov. 12, 2010, provisional application No. 61/413,305, filed on Nov. 12, 2010, provisional application No. 61/413,295, filed on Nov. 12, 2010.

(51) Int. Cl.
*G06F 15/16* (2006.01)
*G06Q 10/10* (2012.01)

(52) U.S. Cl.
CPC .................................. *G06Q 10/103* (2013.01)
USPC ........... 709/206; 709/205; 709/246; 715/200; 715/751

(58) Field of Classification Search
CPC ..................................................... H04L 51/043
USPC ........... 709/204–207, 246; 715/200, 751–753
See application file for complete search history.

(56) References Cited

U.S. PATENT DOCUMENTS 7,594,163 B2 * 9/2009 Slack-Smith .................. 715/751
8,166,119 B2 * 4/2012 Ligh et al. ..................... 709/206
(Continued)

FOREIGN PATENT DOCUMENTS

WO WO 2008/109866 A2 9/2008
WO WO-2012/065127 5/2012
(Continued)

OTHER PUBLICATIONS

International Search Report and Written Opinion, mailed Mar. 16, 2012, for related application PCT/US2011/060466, filed Nov. 11, 2011, 15pages.
(Continued)

Primary Examiner — Bharat N Barot
(74) Attorney, Agent, or Firm — Mahamedi Paradice LLP

(57) ABSTRACT

System and methods for managing content modification messages are provided. In some embodiments, a request to send a modification message to a second user is received from a first user. The request to send the modification message pertains to a modification made to a first user-specific version corresponding to the first user and represented by a first delta. The modification message comprising a second delta is generated. The modification message includes second instructions to modify a second user-specific version to include the modification within the second user-specific version by resolving the first delta and the first user-specific version to the second user-specific version. A message indicator for the modification message is provides to a client device of the second user. The message indicator identifies the first user as the sender of the modification message.

29 Claims, 7 Drawing Sheets

(56) References Cited

U.S. PATENT DOCUMENTS

| | | |
|---|---|---|
| 2003/0167446 A1 | 9/2003 | Thomas |
| 2004/0044774 A1* | 3/2004 | Mangalik et al. ............. 709/205 |
| 2004/0054750 A1 | 3/2004 | de Jong et al. |
| 2004/0230886 A1 | 11/2004 | Livshits |
| 2004/0236752 A1* | 11/2004 | Han et al. ...................... 707/10 |
| 2005/0039116 A1 | 2/2005 | Slack-Smith |
| 2006/0184530 A1 | 8/2006 | Song et al. |
| 2007/0156659 A1 | 7/2007 | Lim |
| 2009/0125128 A1 | 5/2009 | Eldridge et al. |
| 2010/0005520 A1* | 1/2010 | Abbot et al. ................. 709/206 |
| 2011/0173188 A1 | 7/2011 | Walsh et al. |

FOREIGN PATENT DOCUMENTS

| | | |
|---|---|---|
| WO | WO 2013/063138 A1 | 5/2013 |
| WO | WO 2013/142849 A1 | 9/2013 |

OTHER PUBLICATIONS

International Search Report and Written Opinion, mailed Jun. 11, 2013, for related application PCT/US13/33614, filed Mar. 22, 2013, 11pages.

International Search Report and Written Opinion, mailed Dec. 28, 2012, for related application PCT/US2012/061721, filed Oct. 24, 2012, 10pages.

* cited by examiner

SYSTEMS AND METHODS FOR MANAGING USER-SPECIFIC MODIFICATIONS TO SHARED CONTENT ON AN INDIVIDUAL BASIS

CROSS-REFERENCE TO RELATED PATENT DOCUMENTS

This patent application is a U.S. National Stage Filing under 35 U.S.C. 371 from and claims the benefit of priority under 35 U.S.C. §120 to International Patent Application No. PCT/US2011/060466, entitled "Systems And Methods For Managing Content Modification Message," filed on Nov. 11, 2011; which claims the benefit of priority, under 35 U.S.C. Section 119(e), to U.S. Provisional Patent Application Ser. No. 61/413,295, entitled "Co-Locality Detection for Content Delivery," filed on Nov. 12, 2010; U.S. Provisional Patent Application Ser. No. 61/413,305, entitled "Messaging System for Content Modifications," filed on Nov. 12, 2010; U.S. Provisional Patent Application Ser. No. 61/413,337, entitled "Operational Transforms to the Support Divergent Editing and Merging of Content," filed on Nov. 12, 2010; and U.S. Provisional Patent Application Ser. No. 61/413,333, entitled "High Watermarking for Content Presentation," filed on Nov. 12, 2010 which are all incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, 2011, ionGrid, Inc. All Rights Reserved.

TECHNICAL FIELD

This patent document pertains generally to the networked communications and more particularly, but not by way of limitation, to methods and systems for content delivery and presentation.

BACKGROUND

The increasingly widespread adoption of technology to support collaborative work on the authoring and review of electronic content (e.g., documents, presentations, etc.) has presented to a number of technical challenges, ranging from security challenges to resolving conflicts between competing edits to content from multiple authors.

In existing collaboration systems, each user receives a copy of the content that can be viewed and modified by the user. When one user modifies the copy, every other copy of that content is also modified using operational transforms. The communication of modifications results in a sequence of versions that do not vary from copy to copy. Thus a document, through modifications, can be represented by a single, serial progression of versions.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present inventions may be practiced without these specific details. In this description, the word "or" is used as an inclusive disjunction unless otherwise noted. Further, the terms "copy of the content" and "content" are used interchangeably.

A content access server provides electronic content to one or more users in the context of a real-time or face-to-face meeting, in a synchronous or asynchronous collaboration between users, or in other contexts. The content access server may receive modifications from more than one user. Instead of incorporating all of the modifications into a master copy of the content, the content access server stores each modification in connection with the user making the modification. The modifications are stored by the content access server as a delta, or change, to the content. The user, by making modifications, thus creates a version of the content that is specific to the user. When the user accesses his version of the content, the content access system reconstructs the user's version by applying the deltas to the content.

In some instances, the user may share his modifications to the document with another user. The modification is sent as a message within the content and depicts the modification made by the first user to the first user's version. However, the recipient user may have a version of the content that is different from the sending user by virtue of modifications previously made by the recipient user. In these instances, the content access server transforms the sent modification so that it appears correctly in the recipient user's version. Upon receiving the transformed modification, the second user may include the modification in his version or reject the modification. Regardless, the sending user's version includes the sent modification.

In other instances, two or more users may want to compare their versions with each other. The content access server may provide an interface showing the various modifications made by the users. Each user may select which modifications to include in his version.

Copies of the content may be provided in a real-time collaboration where a presenter is presenting the content in a particular order. A high water marking function allows the presenter to prevent other users from skipping ahead to view portions of the content that have not yet been presented. The high water marking function further allows participants who are reviewing portions of the content that have already been presented to skip ahead to the portion of the content that is currently being presented by the presenter.

Figure 1:
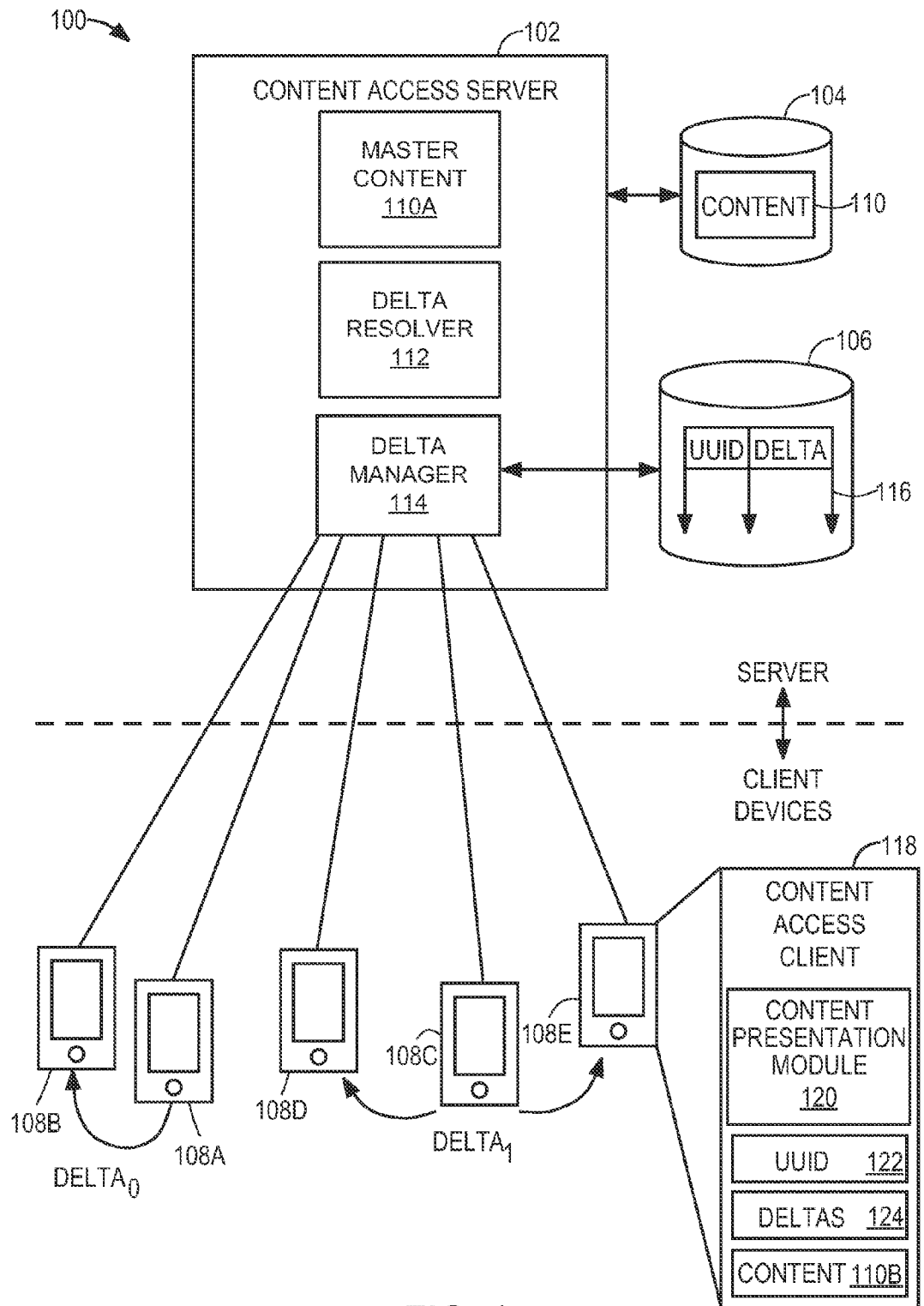
FIG. 1 is a block diagram illustrating a content sharing environment according to one example embodiment.

FIG. 1 is a block diagram illustrating a content sharing environment 100, according to one example embodiment. The content sharing environment 100 includes one or more content access servers 102 that are coupled by a network (e.g., the Internet) to multiple client devices 108A-108E, in the example form of tablet computing devices. While some example embodiments described herein with reference to tablet computing devices (e.g., iPad), other embodiments may deploy other types of client media devices, such as mobile telephones, laptop computers, desktop computers, gaming systems, set top boxes, or any other media presentation device.

The content access server 102 accesses content 110 stored in a persistent storage system 104. The content access server 102 may store many instances of content 110 accessible by one or more users via the content access server 102. The content 110 may be an electronic document, an electronic presentation, an electronic spreadsheet, or any other type of electronic content. The persistent storage system 110 may be network attached storage (NAS), a SharePoint platform, or a database in a relational database management system based on structured query language (SQL). The persistent storage system 104 may include metadata data records associated with the content 110.

The content access server 102, as depicted, includes a copy of the content 110 provided to one or more users, labeled master content 110A. In some implementations, the content access server 102 may not generate a copy of the content 110 and instead access the content 110 as needed. The content access server 102, in response to a request for content 110 from a client device 108, sends a copy of the content 110B to a client device 108 via a network. As discussed later, the content 110B may include one or more modifications not included in content 110A.

The client device 108 comprises a content access client 118. The content access client 118 may be hardware, software, or a combination thereof installed on the client device 108. In some instances, the content access client 118 is a stand-alone web application. The content access client 118, in some embodiments, may be accessed using a web browser installed in the client device 108. A content presentation module 120 may display the content 110B to the user of the client device 108. The content presentation module 120 may further provide a graphical user interface that allows a user to make modifications to the content 110B. The content access client 118 assigns a universal unique identifier (UUID) 122 that uniquely identifies the content 110B and may be associated with access client 118, the user of the client device 108, or the master version of the content (e.g., content 110) being modified.

The user, using the client device 108, may make one or more modifications to the content 110B via the content presentation module 120. The modifications made to the content 110B are recorded as deltas 124 by the client device 108. The deltas may be generated by the content access client 118 using operational transformations. The content 110B is a version of the content 110A and includes the content 110 and the modifications to the content added by the user. The deltas 124, along with the UUID 122, are transmitted to the content access server 102.

The user may further request, via the content presentation module 120, that one or more modifications made by the user are shared with another user. For example, a user of client device 108A may request that a modification, $DELTA_O$, be shared with a user using client device 108B. The content access client 118 of user client device 108A sends the share request to the content access server 102.

At the content access server 102, a delta manager 114 receives the deltas and requests to share modifications. The delta manager 114, upon receiving deltas from a user device 108, stores the received delta 124 in a modification database 106. The modification database 106 may include one or more tables 116 in which the deltas are stored. As depicted, the table 116 may include entries for the UUID of the content being modified and the delta 124 received. The table 116 may include additional or alternative entries for modification data such as a timestamp of the delta (e.g., when the delta was created or accepted by the user, or when the delta was received by the delta manager 114); other identifiers of the user, the user device 108, the content version 110B; or other information about the delta 124.

In instances where one user has shared a modification with another user, the delta manager 112 forwards the delta 124, the identifier of the recipient user, and the UUID of the content 1103 to the delta resolver 112. The delta resolver 112 identifies a version of the content 110 corresponding to the recipient user having a second UUID. The recipient user may have made modifications to his content version of the master content 110A. However, the delta 124 sent by the sending user reflects the modification in relation to the sending user's content version 1108. Because the recipient user has made modifications to his copy of the content, simply applying the delta 124 to the recipient user's content version would not accurately depict the sending user's modification in the recipient user's content version. The delta resolver 112 therefore resolves the sent modification to the recipient user's content version. The delta resolver 112 may resolve the delta using operational transformations. The delta resolver 112 then sends the resolved delta to the delta manager 114.

The delta manager 114 then transmits the resolved delta to the recipient client device 108B. The content access client 118 on the recipient client device 108B displays the modification indicated by the resolved delta within the content version of recipient to the recipient user. The content access client 118 may further provide a user interface that allows the recipient user to accept or reject the modification. If the recipient user accepts the modification, the content access client transmits an indication is sent to the delta manager 114 that then associates the resolved delta with the UUID of the content version of the recipient in table 116. If the recipient user rejects the modification, the resolved delta is not stored in the table 116.

In an example embodiment, a user of the client device 108C may wish to share, or collaborate in the editing and review of, content with the users of client devices 108D and 108E. Consider an example scenario in which an authorizing user of the client device 108C wishes to share content 110 (e.g., a PowerPoint presentation) with each of the users of the client devices 108D and 108E. The content may, as shown in FIG. 1, be stored in a database 104 accessible by the content access server 102. The content 110 (or at least portions of the content 110) may also reside on the client device 108C. At a high level, in order to share (e.g., as a synchronized presentation) the content 110 between the devices 108C-108E (with the user of device 108C being the authorizing user and presenter), the client device 108C may be used to generate and/or communicate a shared key. The shared key may be dynamically generated using one of a number of techniques, or may be an existing key. The shared key is then shared by the authorizing user with other users that are participating, for example, in a meeting in which the authorizing user is to present the content 110.

The authorizing user of the client device 108C, having generated (or accessed) a shared key, communicates the shared key (KI) and a content identifier (UUID) to the content access server 102 via the network. The shared key and the content identifier are received via an interface (e.g., an API) of the content access server 102 and stored in the modification database 106 that is accessible via the content access server 102. The modification database 106 may store a mapping of content identifiers to shared keys, in the example form of the table 116. In one example, a UUID is a directory lookup entry for content. Separate authorization systems (not described here) may be deployed to ensure that clients may truly access the content and to what extent (e.g., according to business/security policies).

In further examples, policies may be extended to apply to particular modifications based on a role of the user making the modification. For example, a presentation may involve participants from two separate organizations. While each participant may have access to the same content, various policies may be enforced to limit the sending of modification messages between participants affiliated with different organization. For example, a participant whose role indicates an affiliation with organization A may not be permitted to send modification messages to any participant whose role indicates an affiliation with organization B.

The authorizing user of the client device 108C further shares the shared key with authorized users of the client devices 108D and 108E. The shared key is then provided from each of the authorized client devices 108D and 108E to the content access server 102. Responsive to receiving the shared key, the content identifier for the shared content is delivered to the client devices 108D and 108E from the content access server 102, so as to enable access via these devices to the shared content. The access provided to the content 110 may, for example, be streaming access from the content access server 102, or may be access to aversion (or at least portion of a version) of the content 110 that is downloaded and stored locally at each of the client devices 108D and 108E. Further, while the content 110 is show in FIG. 1 to be stored in a content database 104 accessible via the content access server 102, in other example embodiments the content 110 may be stored separately from the content access server 102 (e.g., on a content distribution network (CDN)), and may be retrieved and made accessible to the client devices 108C through 108E on the CDN using the content identifier.

From the perspective of the content access server 102, authorization (or verification) data in the form of a shared key and associated content identifier are received from an authorizing device (e.g., client device 108C), the content identifier identifying content to be shared by the authorizing user with authorized user devices. In one example embodiment, the authorization or verification information may constitute participation verification information that may be used to authenticate and verify participation within a content sharing meeting that the authorizing user is facilitating.

The shared key having been shared by the authorizing user with authorized users, the shared key is received at the content access server 102 from each of a number of authorized client devices. Responsive to receipt of the shared key, the content access server 102 authorizes (and may provide) access to the shared content. To this end, the content access server 102 provides the content identifier to each of these authorized user devices, using which each of the authorized user devices can access the shared content 110.

Figure 2:
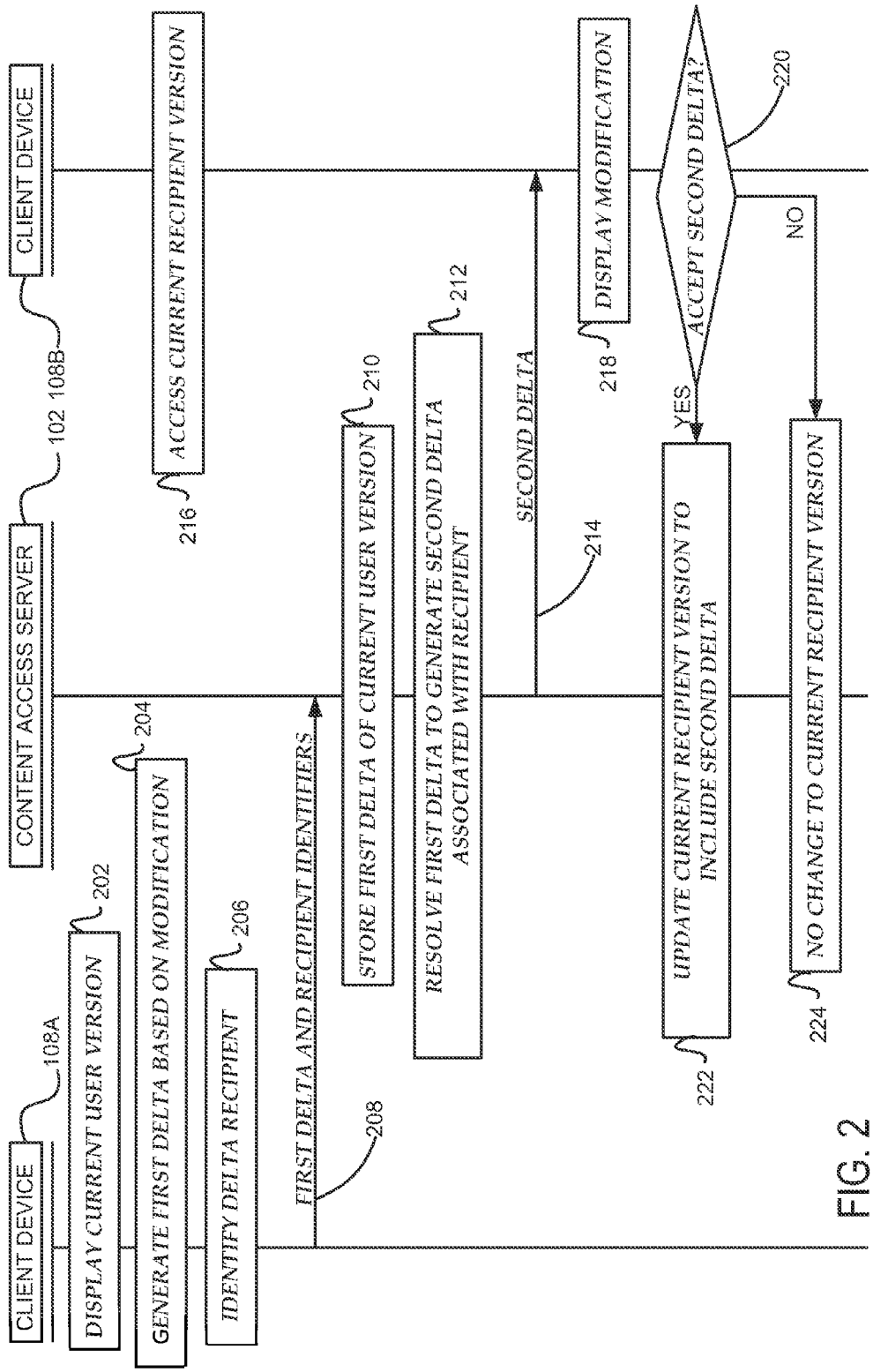
FIG. 2 is a multi-lane flow diagram depicting example operations according to an example embodiment.

FIG. 2 is a multi-lane flow diagram depicting example operations 200 according to an example embodiment. The operations 200 cause a modification generated by a user to be recorded in the table 116 for later retrieval and a modification to be sent to a recipient user as a message. The operations 200 may be performed by the content access server 102 and the client devices 108 (e.g., client devices 108A and 108B).

In an operation 202 performed by the client device 108A, the current user version of content (e.g., content 110) is displayed to the user. The current user version may be a copy of the content master 110A or may be generated from the content master 110A and include earlier modifications made by the user to the content master 110A. The earlier modifications may be stored in the modifications database 106 in the table 116. To generate the current user version, the delta manager 114 may retrieve the deltas corresponding to the UUID of the content and the user.

In an operation 204, the user of the client device 108A modifies the current user version of the content 110, causing the content access client 108 to generate a first delta to record an indication of the modification. The first delta may be generated using an operational transformation.

In an operation 206, the user may designate one or more recipient users to whom to send the modification in the form of a modification message. The content access client 108 identifies the recipient users. In an operation 208, at least the first delta and the recipient identifiers are transmitted via a network to the content access server 102.

At the content access server 102, the delta manager 114 records the first delta corresponding to the current user version in an operation 210. The next time the user accesses the current user version, the current user version will include the modification.

For each recipient of the modification message, the operations 212 through 224, described below, are repeated.

In an operation 212, the first delta is resolved with the current recipient version of the content 110 to generate a second delta associated, with the recipient. The second delta may be generated using operational transformation by the data resolver 112. For each recipient, a new delta is generated based on the current version of the content 110 corresponding to each recipient. In an operation 214, the second delta is sent to the client device 108B of the recipient user.

In operation 216, the current recipient version of the recipient is accessed. Like operation 202, the current recipient version is generated based, on the content 110 and one or more deltas stored in association with the recipient user. Operation 216 may be performed before the second delta is received or after the second delta is received (operation 214). In some instances, the sending user and the recipient user may be concurrently viewing the content. In other instance, the recipient user may be viewing the content some time after the sending user made the modification.

In operation 218, the modification is displayed to the recipient at the client device 108B. The modification may take the graphical form of a message or some other graphical form. The message may include an option that allows the recipient user to accept or reject the modification.

In some instances, the recipient may delay accepting or rejecting modifications. In these instances, as messages are received, a message count indicator may be displayed adjacent to a displayed sender identifier. Upon selecting the message count indicator, the modification messages sent to the recipient are displayed to the recipient. Until the recipient affirmatively approves the modification, the modification is not incorporated in to the current version of the recipient. In instances where the modification messages are accepted out of order or as a batch, the second delta corresponding to each modification may be updated using operational transformations or according to the process detailed in FIG. 7 and the accompanying description.

In an operation 220, a determination is made as to whether the recipient has accepted the modification. If the modification was accepted, in operation 222, the current recipient version is updated to include the second delta at the content access server 102. If the modification was not accepted, in operation 224, no change is made to the current recipient version at the content access server 102.

In some instances, with reference to FIG. 1, and considering a situation in which multiple users are collaboratively viewing the shared content 110 using respective client devices 108 (e.g., viewing a PowerPoint presentation be controlled from an authorization client device 108C), certain of the attendees may wish to provide a presenter with feedback regarding the shared content, while viewing a particular section of segment of the shared content and while the feedback is still fresh in their minds. At the same time, the attendees may not wish to interrupt the presentation in order to provide such feedback, According to an example embodiment, there is provided a method and system to enable messaging of modifications with respect to a current user version of the content. The modification may comprise annotation and comment information relating to the content, and/or instructions regarding the modification of the content itself (e.g., insertions, additions or changes to the content). Further, the modification is communicated to an intended recipient in the form of a message as depicted in FIG. 2, which the recipient can selectively accept in order to have the modification information applied to a specific content item. To this end, a modification message, in addition to including modification information as a payload, may comprise addressee information, addressor information and a content identifier (e.g., a UUID) identifying content to which the modification is to be applied.

Figure 3:
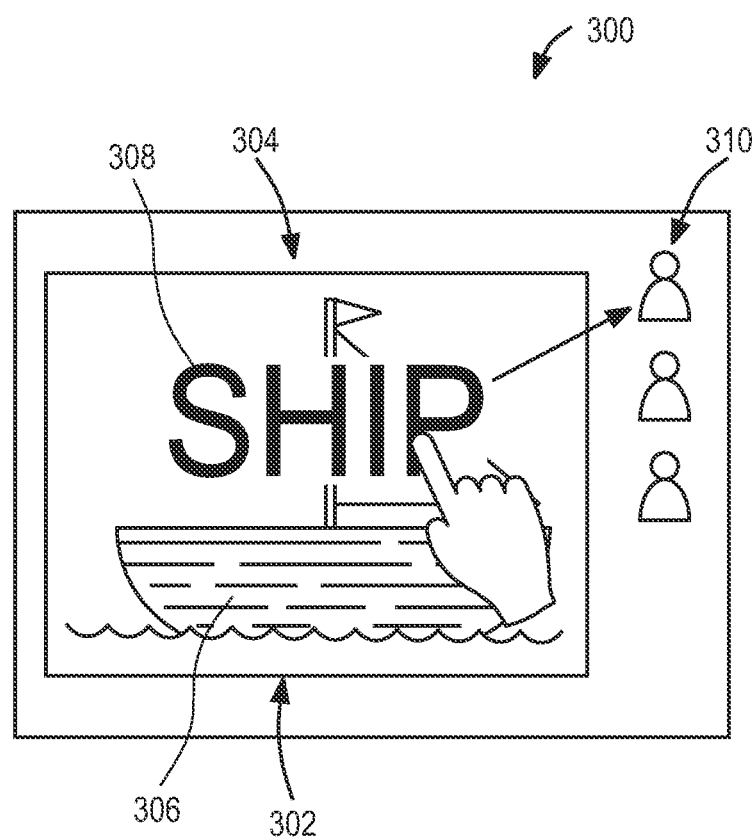
FIG. 3 is a user interface diagram illustrating an example user interface that may be presented by a content access client, executing on a client device.

FIG. 3 is a user interface diagram illustrating an example user interface 300 that may be presented by a content access client 118, executing on a client device 108. In one embodiment, the user interface 300 may be generated by a content presentation module 120 that is instantiated on the client device 108 by the content access client 118. The user interface 300 is shown to include a background 302, and a canvas 304 displaying content, in the example form of a graphic 306. A user, using an input device such as a touch screen, mouse or keyboard, may generate modification data with respect to the displayed content. In the illustrated example, using a touch screen, a user is shown to have provided annotation data 308 in the example of the word "SHIP", which identifies subject matter of the displayed content image.

The user interface 300 is also shown to display addressee information, in the example form of a buddy list 310. In one example embodiment, the annotating user may select a recipient for the modification data (e.g., the annotation) by dragging and dropping the annotation on (or by gesturing the annotation in the direction of) a user icon in the buddy list. Accordingly, the content access client 118 is able to associate of the modification data with both content (e.g., a displayed image) and a recipient, and to compose a modification message using this information. In another example embodiment, the modification data may apply directly to the content. For example, where the displayed content is a text document, the modification data may reflect edits to the text document made by a viewing user. In this case, the modification data may be converted into a set of instructions to modify the displayed content, and this set of instructions then included in the modification message.

Figure 4:
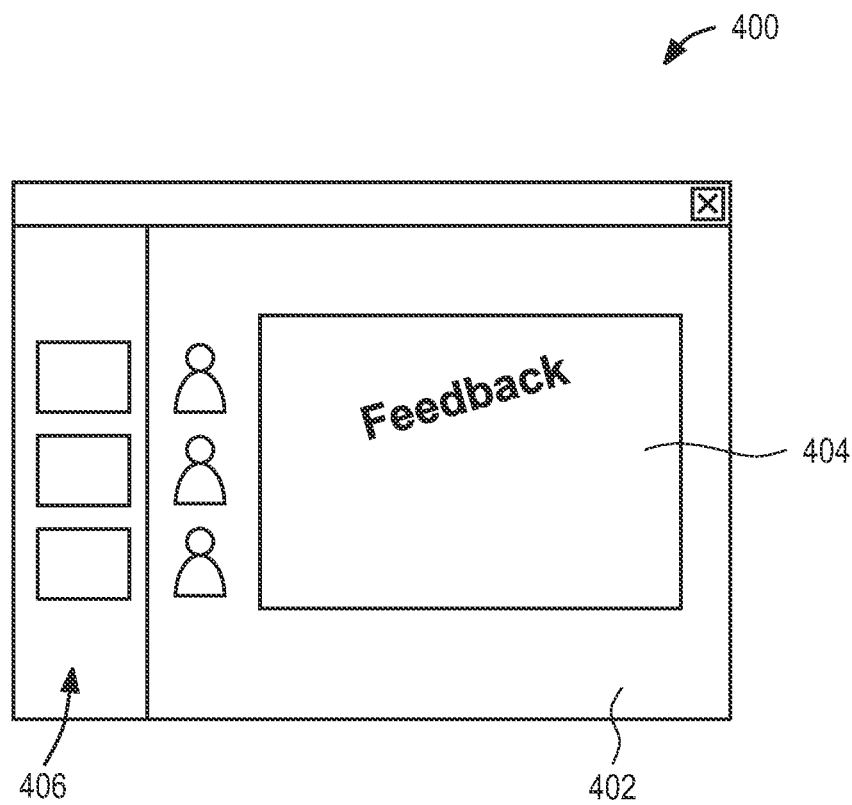
FIG. 4 is a user interface diagram illustrating an example user interface that may be displayed on a client device of a presenting user.

FIG. 4 is a user interface diagram illustrating an example user interface 400, according to an example embodiment, that may be displayed on a client device 108 of a presenting user. The interface 400 includes a background 402, and a canvas 404 in which a content item is displayed. Further, a modification message influx panel 406 displays a set of message indicators in the forms of icons, each representative of a received modification message from, for example, attendees of a presentation of the content item. User icons may be displayed in association with message icons to provide a visual identification of the respective senders of the modification messages. User selection of a particular modification message, in one embodiment, causes the modification information of the selected message to be applied to the content of displayed in the canvas 404. A presenting user may thus select and deselect one or more messages from the inbox panel 406 to apply and unapply modification information to a displayed content item. Where multiple modification messages are activated and applied, the modifications may be displayed in an overlaid manner.

Figure 5:
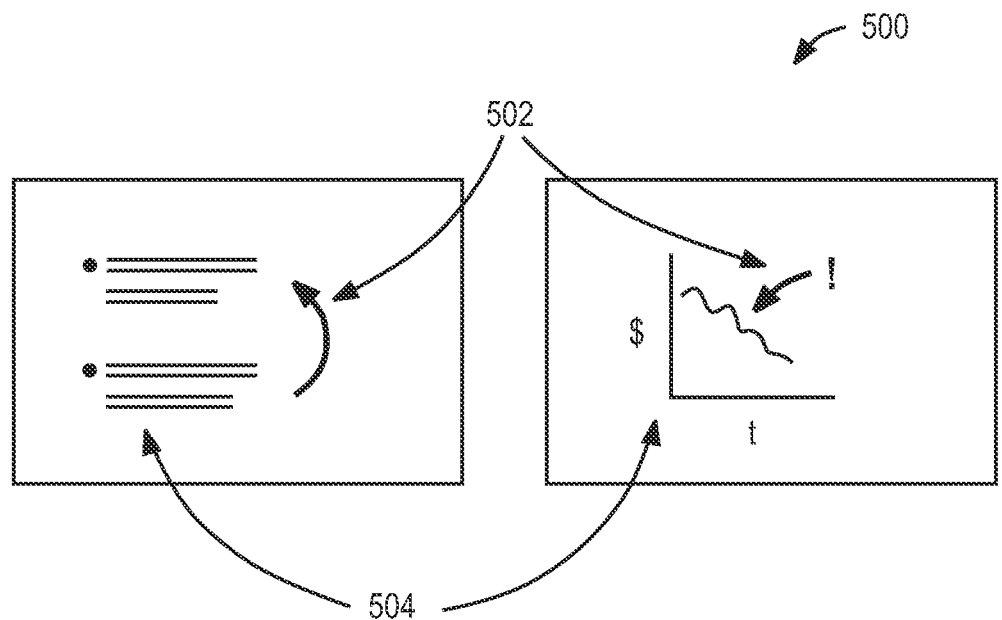
FIG. 5 illustrates the application of two instances of annotation data (as example modifications) to different slides of a PowerPoint presentation.

In a further example embodiment, each modification message may apply to multiple segments or pieces of a content item (e.g., to multiple slides of a PowerPoint presentation). Accordingly, a viewing user may collect modification data relating to multiple slides of a PowerPoint presentation on his or her client device, and send this collected modification data to a particular recipient in a single modification message. FIG. 5 illustrates the application of two instances of annotation data 502 (as an example of modification data) to different slides 504 of a PowerPoint presentation.

It will be appreciated that the modification messaging system and methodology described above enables a viewing user to communicate modification information to a presenting user in a non-intrusive manner, and while faults pertaining to displayed content of fresh in the mind of the viewing user. A presenting user is also able to accumulate feedback from multiple viewing users in a real-time during a presentation, without having such feedback interrupt the presentation. Of course, should a presenting user wish to pause presentation to consider accumulated feedback (or at least feedback from an important viewing user) at any point during a presentation, the presenting user has the option to do so.

Figure 6:
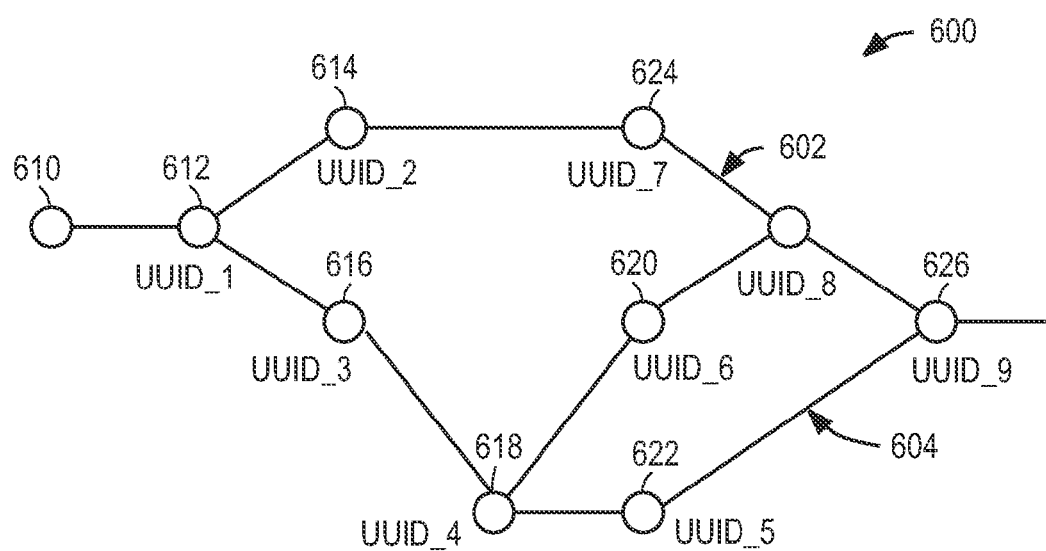
FIG. 6 is a node diagram that provides a diagrammatic representation of the divergence and convergence (or merging) of multiple versions of a shared content item.

FIG. 6 is a node diagram 600 that provides a diagrammatic representation of the divergence and convergence (or merging) of multiple versions of a shared content item (e.g., a PowerPoint presentation, word document etc.). Each node is associated with a different version of a particular content item, and has an associated content identifier, in the example form of a UUID. A master version 610 of the content (e.g., master content 110A) is shown to be modified to generate a first modified version 612, subsequent to which divergent modifications generate second and third modified versions 614 and 616. For example, subsequent to the generation of the modified version 612, this version of the content item may have been locally stored on respective client devices 108, and then subject to different modifications in order to generate the modified versions 614 and 616. A further divergence is shown to have occurred with respect to version 618, in order to generate versions 620 and 622.

In a further example embodiment, it may be desirable to automatically merge modified versions of shared content (e.g., version 620, 622, and 624). In one example embodiment, the content access server 102, shown in FIG. 1, may include merge logic (not shown) that performs an automated merge function using operational transforms. Specifically, the merge logic may receive, from respective client devices 108, divergent versions of shared content 110 that have been modified by users of the client devices 108. The modification of shared content may result in the allocation of a new content identifier UUID) for the modified version. A content access client 118, hosted on a client device 108, may generate a new content identifier for content 110 locally stored each time that the content 110 is saved. The content access client 118 may further implement a version system, where different versions of the shared content are stored, each version with a unique content identifier.

Returning to the above example, once the versions 620, 622, and 624 having been generated, merge logic on the content access server 102 may be deployed to merge these divergent versions. Specifically, the merge logic uses operational transforms, supplemented by policy enforcement, to merge the versions 620, 622, and 624 (these diversions having diverged as a result of separate offline modifications) as shown in FIG. 6 to generate merged version 626. Accordingly, the operational transforms are used, not to resolve online conflicts that result from users simultaneously editing the document, but to perform the merging of different versions of content that may have been modified separately and offline, in a non-collaborative manner. A conflict resolution policy may be used to resolve a conflict situations, by giving priority to modifications made by a particular user (e.g., based on seniority), or based on other criteria such as date and time, geolocation etc.

According to some example embodiments, there may be a need to merge divergent versions of common original shared content without using operational transforms. Consider an example in which shared content is made accessible to client devices 108 within the context of the environment shown in FIG. 1, with respective copies of shared content 110 being stored on each of the respective client devices 108. Each of the users of the client devices 108D and 108E may be enabled, a via a content access client 118, to edit locally stored copies (or versions) of the shared content 110. This may be particularly desirable in situations where network connection to a common version of the shared content 110 cannot be maintained (e.g., when a user is traveling on an aircraft that does not provide Internet access for network connectivity). The merging of divergent versions (or copies) of shared content may present a number of technical challenges. The manual merging, according to example embodiments, of such divergent versions of shared content is discussed below.

Figure 7:
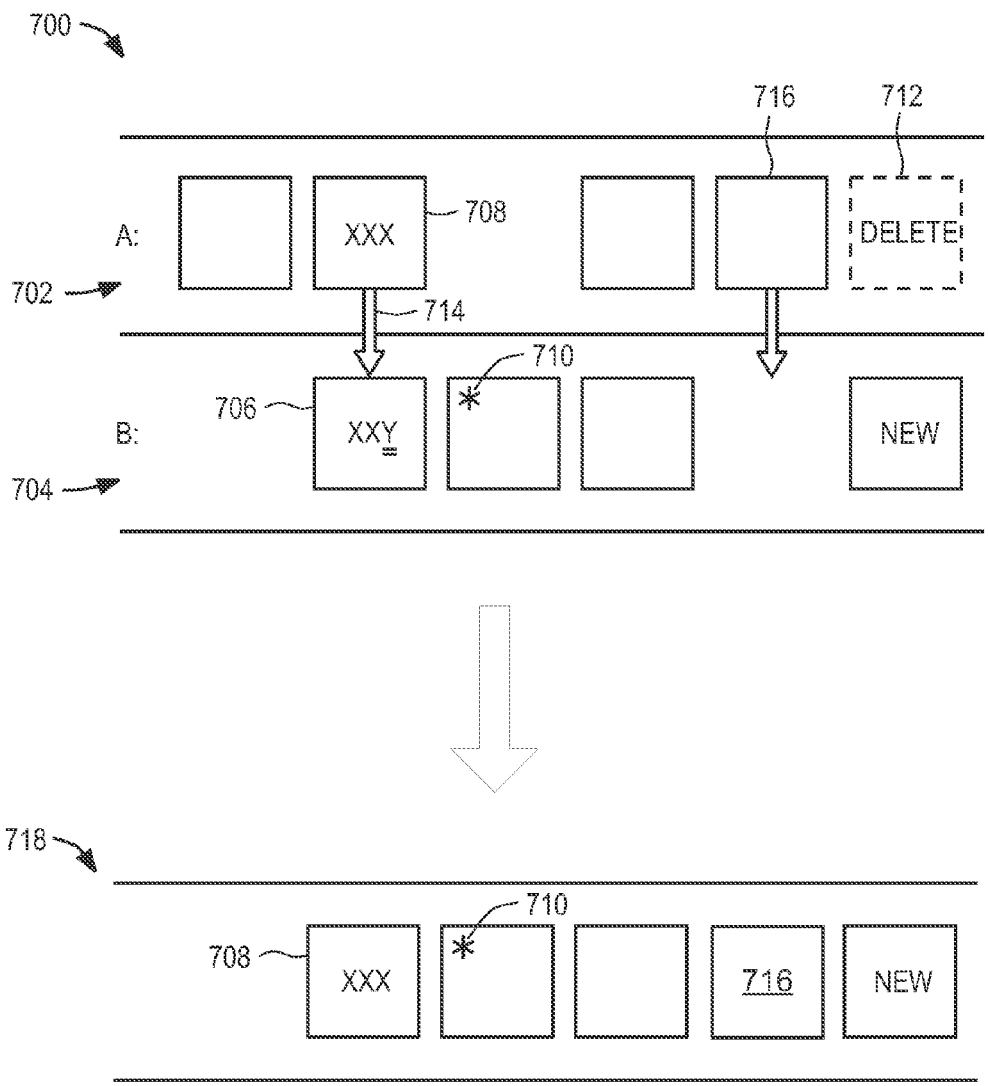
FIG. 7 is a diagrammatic representation of a user interface and illustrates an example method whereby the merging of the first and second versions of content by a user may be facilitated.

FIG. 7 is a diagrammatic representation of a user interface 700, and illustrates an example method whereby the manual or semi-automatic merging of the first and second versions of content by a user may be facilitated. Within the context of the user interface 700 (which may be generated by the content presentation module 120 of a content access client 118 hosted on a client device 108 or by a merge module (not depicted) in the content access server 102), the first and second versions of a particular content item 10 may be presented. For example, a first version 702 of a PowerPoint presentation is displayed in a first horizontally extending section (or "lane") of the user interface 700, and a second a version 704 of the PowerPoint presentation is presented in a second horizontally extending section of the user interface 700. Each of the first and second of versions of the content are shown to comprise defined content segments e.g., slides of a PowerPoint presentation).

Segments of each version of the content that had been modified relative to a master version 110A, a current version of the content may be identified, and the nature of the relevant modification may be graphically indicated for each such modified segment. For example, the segment 706 of the second version 704 is shown to have been modified relative to the segment 708 of the version 702 (which may itself have been unmodified relative to an earlier, master version of the content). A segment 710 of the second version 704 may furthermore be visually tagged as being a newly inserted content segment. In a further example, a segment 712 of the first version 702 is shown visually to have been deleted from that version of the content.

The user interface 700 enables a user conveniently to merge the versions 702 and 704 through a gesture-based manipulation of the content segments (e.g., a drag and drop operation). For example, content segments from one version may be dragged, within the context of the user interface 700, so as to replace segments of another version. FIG. 7 shows content segment 708 of the first version 702 as being dragged (as indicated by the arrow 714) so as to replace the content segment 706 of the second version 704. Similarly, the content segment 716 may be dragged and dropped to insert of this content segment 716 into the second version 704.

In a further example embodiment, as opposed to providing replacement functionality, an intermediate "master" lane may be provided within the user interface, separating the "version" lanes in which the respective first and second versions of the content are displayed. The interface 700 may then implement drag and drop functionality to enable a user to select content segments from either the first version 702 or the second version 704, and drag and drop the selected segments into the master lane to create a new version of the shared content.

At user interface 718, a single lane is displayed that depicts the manually merged versions. As shown, in response to the drag and drop operations performed by the user, the merged version includes content segment 708 of the first version 702, segment 710 of the second version 704, and content segment 716 of the first version 702.

It will also be appreciated that of the methodology described above may be used to create new shared content from historically distinct and separate shared content. For example, the content segments within an upper lane may be segments of a first PowerPoint presentation, and the content to segments in the lower lane may be segments of a second PowerPoint presentation. Using the drag and drop functionality described herein, a user may combine the segments, through the gesture-based manipulation of the segments, into a new a PowerPoint presentation.

In instances where a presenting user is presenting content 110 (e.g., using client device 108C) to viewing users (e.g., using client devices 108D and 108E), a presentation location (e.g., high water mark) may be monitored. The presentation location is a sequential location within the content 110 to which the presenter has advanced in the presentation of the shared content to the viewing user (e.g., that is currently being displayed by the client device 108C of the presenting user). The presentation location may alternatively be a non-sequential location that precedes an immediately preceding presentation location (e.g., where the presenting user has revisited to an earlier location in the content 110). In this instance, the immediately preceding presentation location is retained as the presentation location. Further, during the presentation, and independently of the actions of the presenting user, each viewing user may be allowed to access a preceding location in the shared content that sequentially precedes the presentation location within the shared content.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, hut deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
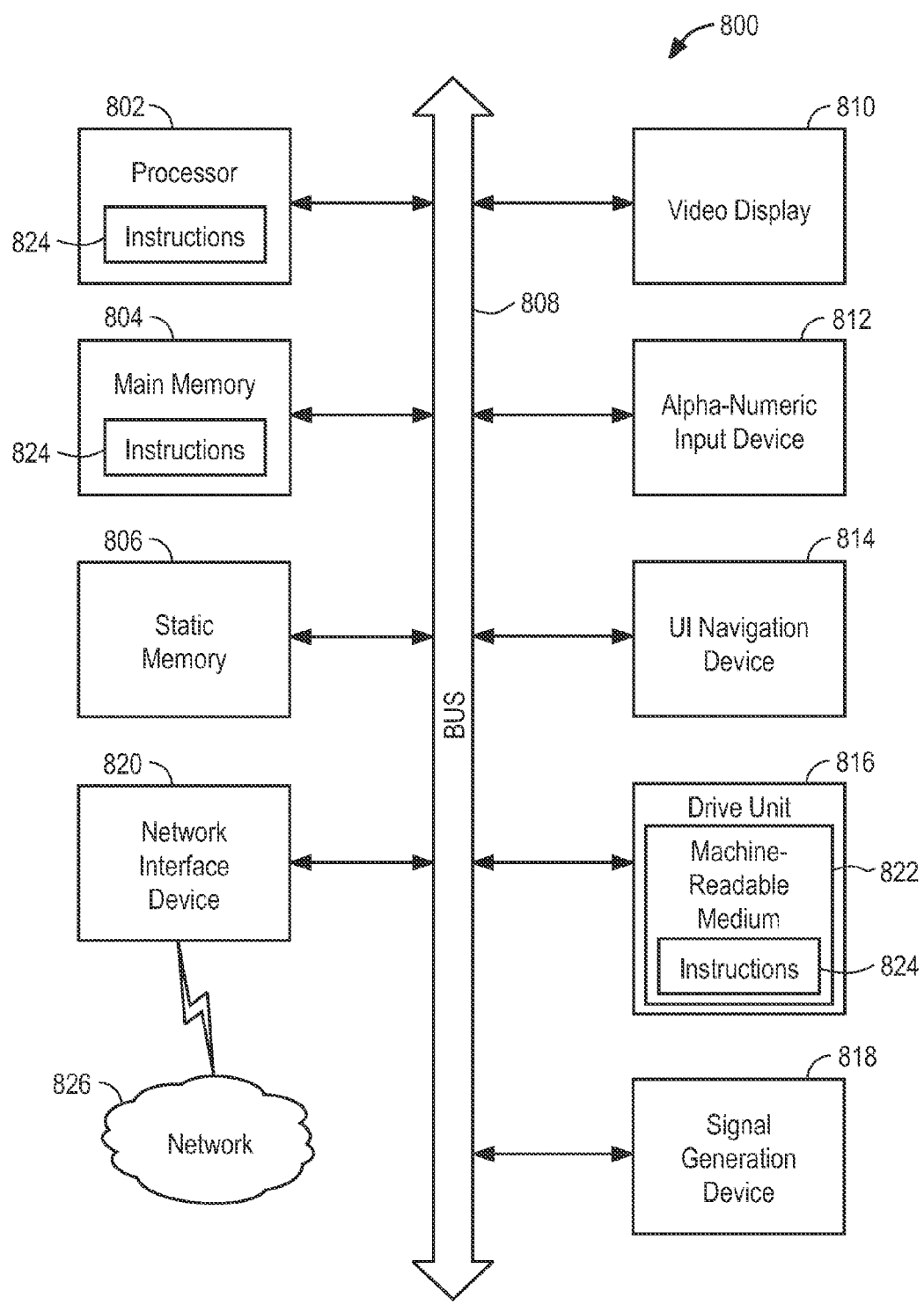
FIG. 8 is a block diagram of machine in the example form of a computer system within which instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (FDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may farther include a video display unit 810 (e.g., a liquid crystal display (LCD) or a cathode ray tube (CRT)). The computer system 800 also includes an alphanumeric input device 812 (e.g., a keyboard or touch screen), a user interface (UI) navigation device 814 (e.g., a mouse or touch screen), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wifi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of managing shared content on a server in a communications network, the method being performed by one or more processors of the server and comprising:

receiving a request to send a modification message from a computing device of a first user of a plurality of users in the communications network, wherein the request includes information identifying a first modification to a master copy of content stored by the server and a second user of the plurality of users to which the modification message is to be sent, wherein the first modification is attributed to a first user-specific version of the content, and wherein the first user-specific version of the content is associated with the first user;

determining a second modification to the master copy of the content based on (i) the first modification to the master copy and (ii) a second user-specific version of the content, wherein the second user-specific version of the content is associated with the second user;

transmitting the modification message, to a computing device of the second user, wherein the modification message includes information identifying the second modification to the master copy of the content and the first user as a sender of the modification message;

receiving a response from the second user accepting or rejecting the second modification to the master copy of the content; and based on the response from the second user, selectively attributing the second modification to the second user-specific version of the content without modifying the first user-specific version of the content.

2. The method of claim 1, wherein selectively attributing the second modification to the second user-specific version of the content comprises:

attributing the second modification to the second user-specific version of the content in response to the second user accepting the second modification to the master copy of the content.

3. The method of claim 1, wherein the second modification includes annotations or edits to the master copy of the content.

4. The method of claim 1, further comprising:

receiving a plurality of requests to send modification messages from the plurality of users, wherein each of the plurality of modification messages is to be addressed to the second user;

generating the plurality of modification messages, wherein each of the plurality of modification messages includes a respective modification to the master copy of the content based, at least in part, on (i) a user-specific version of the content that is associated with a respective user of the plurality of users and (ii) the second user-specific version of the content; and transmitting the plurality of modification messages to the computing device of the second user.

5. The method of claim 1, wherein the modification message further comprises instructions to modify the second user-specific version of the content to reflect the second modification to the master copy of the content.

6. The method of claim 5, further comprising:

receiving a gesture input from the computing device of the first user, wherein the gesture input corresponds to a selection of the second user via a user interface displayed on the computing device of the first user.

7. The method of claim 6, further comprising:

displaying, in the user interface, a representation of the second user in association with the first user-specific version of the content.

8. The method of claim 1, further comprising:

presenting the first user-specific version and the second user-specific version of the content on a user interface displayed on the computing device of the second user, wherein the content is divided into a plurality of segments;

indicating, relative to the master copy of the content, one or more modified segments from the first and second user-specific versions of the content;

receiving a selection input from the second user for at least one of the one or more modified segments from the first user-specific version of the content; and based on the selection input, merging the at least one modified segment into the second user-specific version of the content.

9. The method of claim 8, wherein the selection input corresponds with a gesture-based manipulation of the first user-specific version and the second user-specific version of the content.

10. The method of claim 1, further comprising:

determining that the first user is authorized to send the modification message to the second user based on one or more policies.

11. A system comprising:

a delta manager to receive a request to send a modification message from a computing device of a first user of a plurality of users in a communications network, wherein the request includes information identifying a first modification to a master copy of content stored by the system and a second user of the plurality of users to which the modification message is to be sent, wherein the first modification is attributed to a first user-specific version of the content, and wherein the first user-specific version of the content is associated with the first user;

a delta resolver to determine a second modification to the master copy of the content based on (i) the first modification to the master copy and (ii) a second user-specific version of the content, wherein the second user-specific version of the content is associated with the second user; and one or more processors to:

transmit the modification message to a computing device of the second user wherein the modification message includes information identifying the second modification to the master copy of the content and the first user as a sender of the modification message; and receive a response from the second user accepting or rejecting the second modification to the master copy of the content; and wherein the delta manager is to selectively attribute the second modification to the second user-specific version of the content without modifying the first user-specific version of the content based on the response from the second user.

12. The system of claim 11, wherein the delta manager is selectively to attribute the second modification to the second user-specific version of the content by:

attributing the second modification to the second user-specific version of the content in response to the second user accepting the second modification to the master copy of the content.

13. The system of claim 11, wherein the second modification includes annotations or edits to the master copy of the content.

14. The system of claim 11, wherein the delta manager is to further:

receive a plurality of requests to send modification messages from the plurality of users, wherein each of the plurality of modification messages is to be addressed to the second user, and wherein the delta resolver is to further generate the plurality of modification messages, wherein each of the plurality of modification messages includes a respective modification to the master copy of the content based, at least in part, on (i) a user-specific version of the content that is associated with a respective user of the plurality of users and (ii) the second user-specific version of the content.

15. The system of claim 11, wherein the modification message further comprises instructions to modify the second user-specific version of the content to reflect the second modification to the master copy of the content.

16. The system of claim 15, wherein the one or more processors are to further:
receive a gesture input from the computing device of the first user, wherein the gesture input corresponds to a selection of the second user via a user interface displayed on the computing device of the first user.

17. The system of claim 16, wherein the one or more processors are to further:
display, in the user interface, a representation of the second user in association with the first user-specific version of the content.

18. The system of claim 11, further comprising a merge module to:
present the first user-specific version and the second user-specific version of the content on a user interface displayed on the computing device of the second user, wherein the content is divided into a plurality of segments;
indicate, relative to the master copy of the content, one or more modified segments from the first and second user-specific versions of the content;
receive a selection input from the second user for at least one of the one or more modified segments from the first user-specific version of the content; and
based on the selection input, merge the at least one modified segment into the second user-specific version of the content.

19. The system of claim 18, wherein the selection input corresponds with a gesture-based manipulation of the first user-specific version and the second user-specific version of the content.

20. The system of claim 11, wherein the delta manager is to further:
determine that the first user is authorized to send the modification message to the second user based on one or more policies.

21. A non-transitory machine-readable medium having first instructions embodied thereon that when executed by one or more machines perform operations comprising:
receiving a request to send a modification message from a computing device of a first user of a plurality of users in a communications network wherein the request includes information identifying a first modification to a master copy of content stored by the one or more machines and a second user of the plurality of users to which the modification message is to be sent, wherein the first modification is attributed to a first user-specific version of the content, and wherein the first user-specific version of the content is associated with the first user;
determining a second modification to the master copy of the content based on (i) the first modification to the master copy and (ii) a second user-specific version of the content, wherein the second user-specific version of the content is associated with the second user;
transmitting the modification message to a computing device of the second user, wherein the modification message includes information identifying the second modification to the master copy of the content and the first user as a sender of the modification message;
receiving a response from the second user accepting or rejecting the second modification to the master copy of the content; and
based on the response from the second user, selectively attributing the second modification to the second user-specific version of the content without modifying the first user-specific version of the content.

22. The non-transitory machine-readable medium of claim 21, wherein the first instructions cause the one or more machines to:
attribute the second modification to the second user-specific version of the content in response to the second user accepting the second modification to the master copy of the content.

23. The non-transitory machine-readable medium of claim 21, wherein the second modification includes annotations or edits to the master copy of the content.

24. The non-transitory machine-readable medium of claim 21, further comprising instructions for:
receiving a plurality of requests to send modification messages from the plurality of users, wherein each of the plurality of modification messages is to be addressed to the second user;
generating the plurality of modification messages, wherein each of the plurality of modification messages includes a respective modification to the master copy of the content based, at least in part, on (i) a user-specific version of the content that is associated with a respective user of the plurality of users and (ii) the second user-specific version of the content; and
transmitting the plurality of modification messages to the computing device of the second user.

25. The non-transitory machine-readable medium of claim 21, wherein the modification message further comprises instructions to modify the second user-specific version of the content to reflect the second modification to the master copy of the content.

26. The non-transitory machine-readable medium of claim 25, further comprising instructions for:
receiving a gesture input from the computing device of the first user, wherein the gesture input corresponds to a selection of the second user via a user interface displayed on the computing device of the first user.

27. The non-transitory machine-readable medium of claim 21, further comprising instructions for:
presenting the first user-specific version and the second user-specific version of the content on a user interface displayed on the computing device of the second user, wherein the content is divided into a plurality of segments; and
based on the selection input, merging the at least one modified segment into the second user-specific version of the content.

28. The non-transitory machine-readable medium of claim 27, wherein the selection input corresponds with a gesture-based manipulation of the first user-specific version and the second user-specific version of the content.

29. The non-transitory machine-readable medium of claim 21, further comprising instructions for:
determining that the first user is authorized to send the modification message to the second user based on one or more policies.

* * * * *